United States Patent
Hayes (10) Patent No.: US 10,399,500 B2
(45) Date of Patent: Sep. 3, 2019

(54) ACTUATABLE COMPACT VEHICLE STEP

(71) Applicant: Rock-Slide Engineering, LLC, North Logan, UT (US)

(72) Inventor: Mark David Hayes, Smithfield, UT (US)

(73) Assignee: Rock-Slide Engineering, LLC, North Logan, UT (US)

( * ) Notice: Subject to any disclaimer, the term of this patent is extended or adjusted under 35 U.S.C. 154(b) by 0 days.

(21) Appl. No.: 16/120,209

(22) Filed: Aug. 31, 2018

(65) Prior Publication Data

US 2019/0126834 A1 May 2, 2019

Related U.S. Application Data (60) Provisional application No. 62/578,258, filed on Oct. 27, 2017.

(51) Int. Cl.
*B60R 3/02* (2006.01)

(52) U.S. Cl.
CPC ............. *B60R 3/02* (2013.01); *B60Y 2200/14* (2013.01)

(58) Field of Classification Search
CPC .. B60R 3/00; B60R 3/02; B60R 3/002; B60R 3/007; B62D 37/02; B62D 35/008; B60Y 2200/14
See application file for complete search history.

(56) References Cited

U.S. PATENT DOCUMENTS

| | | |
|---|---|---|
| 2,492,068 A | 12/1949 | Schofield et al. |
| 2,653,036 A | 9/1953 | Creel et al. |
| 3,329,443 A | 7/1967 | Lowder et al. |
| 3,388,925 A | 6/1968 | Chavira et al. |
| 3,751,068 A | 8/1973 | Green |
| 3,762,742 A | 10/1973 | Bucklen |
| 3,834,490 A | 9/1974 | Ford |
| 3,915,475 A | 10/1975 | Casella et al. |
| 3,955,827 A | 5/1976 | Wonigar |
| 4,180,143 A | 12/1979 | Clugston |
| 4,462,486 A | 7/1984 | Dignan |
| 4,623,160 A | 9/1986 | Trudell |
| 5,624,127 A | 4/1997 | Arreola et al. |
| 5,803,475 A | 9/1998 | Dick |
| 5,842,709 A | 12/1998 | Maccabee |
| 6,168,176 B1 | 1/2001 | Mueller |
| 6,170,842 B1 | 1/2001 | Mueller |

(Continued)

OTHER PUBLICATIONS

Amp Research Bedstep, www.amp-research.com/products/truckaccessories/bedstep, Jun. 26, 2018.

(Continued)

*Primary Examiner* — Bryan A Evans (74) *Attorney, Agent, or Firm* — Preston P. Frischknecht; Project CIP (57) ABSTRACT

The invention relates to an actuatable compact vehicle step with first and second step portions that bifurcate from a single axis when moving from nested to extended positions to provide two or more tiered steps, the second step in a position substantially below the first step when deployed. In various embodiments, step portions travel on curved tracks from the nested position to allow them to be both well-concealed when nested and optimally extended when deployed.

19 Claims, 6 Drawing Sheets

(56) References Cited

U.S. PATENT DOCUMENTS

| | | | |
|---|---|---|---|
| 6,533,303 | B1 | 3/2003 | Watson |
| 6,840,526 | B2 | 1/2005 | Anderson et al. |
| 7,118,150 | B2 | 3/2006 | Bruford et al. |
| 7,168,722 | B1 | 6/2007 | Piotrowski et al. |
| 7,398,985 | B2 | 7/2008 | Leitner et al. |
| 7,413,204 | B2 | 8/2008 | Leitner |
| 7,413,205 | B2 * | 8/2008 | Watson ............... B60R 3/02 280/163 |
| 7,487,986 | B2 | 2/2009 | Leitner et al. |
| 7,494,144 | B1 | 2/2009 | Carr |
| 7,584,975 | B2 | 9/2009 | Leitner |
| 7,637,519 | B2 | 12/2009 | Leitner et al. |
| 7,703,784 | B2 | 4/2010 | Plavetich |
| 7,740,260 | B2 | 6/2010 | VanBelle et al. |
| 7,740,261 | B2 | 6/2010 | Leitner et al. |
| 7,744,106 | B2 | 6/2010 | VanBelle et al. |
| 7,823,896 | B2 | 11/2010 | VanBelle et al. |
| 8,056,913 | B2 | 11/2011 | Kuntze et al. |
| 8,827,294 | B1 | 9/2014 | Leitner et al. |
| 9,346,405 | B2 | 5/2016 | Leitner et al. |
| 9,522,634 | B1 | 12/2016 | Smith |
| 9,701,249 | B2 | 7/2017 | Leitner et al. |
| 9,725,041 | B2 | 8/2017 | Rinaldi |
| 9,764,691 | B2 | 9/2017 | Stickles et al. |
| 9,944,231 | B2 | 4/2018 | Leitner et al. |
| 2003/0094781 | A1 | 5/2003 | Jaramillo et al. |

OTHER PUBLICATIONS

Amp Research Bedstep, www.amp-research.com/products/truckaccessories/bedstep2tm/, Jun. 26, 2018.
Lund Bedstep, www.realtruck.com/lund-bedstep/, Jun. 26, 2018.

* cited by examiner

ACTUATABLE COMPACT VEHICLE STEP

RELATED APPLICATIONS

This application relates to and claims priority from a U.S. provisional patent application, Application No. 62/578,258, filed on Oct. 27, 2017.

BACKGROUND OF THE INVENTION

Actuatable steps have grown in popularity—specifically in connection with off-road-type vehicles such as Jeeps, SUVs, trucks, rock crawlers. According to recent trends, sales for these vehicles, and the overall numbers of them on the road, increase year-over-year. For many models, clearance and other height specifications can hinder user access to various areas of the vehicle. Truck beds are one of many such areas that can be difficult to access. There are currently limited options for consumers looking for smaller, discrete and actuatable steps, including bed, rack, or ancillary rocker guard-type steps. Such steps could provide valuable functionality to OEM vehicles by facilitating easier user access to different portions, elevations, or features of a vehicle, including truck beds.

SUMMARY OF THE INVENTION

In accordance with the above, an actuatable compact step for a vehicle is provided. The actuatable compact vehicle step has first and second step portions that bifurcate from a single axis when moving from nested to extended positions to provide two or more tiered steps, the second step in a position substantially below the first step when deployed. In various embodiments, step portions travel on curved tracks from the nested position to allow them to be both well-concealed when nested and optimally extended when deployed.

BRIEF DESCRIPTION OF THE FIGURES

To further clarify the above and other aspects of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The drawings may not be drawn to scale. The invention will be described and explained with additional specificity and detail through the accompanying drawings in which.

DETAILED DESCRIPTION OF THE ILLUSTRATED EMBODIMENT

Figure 1:
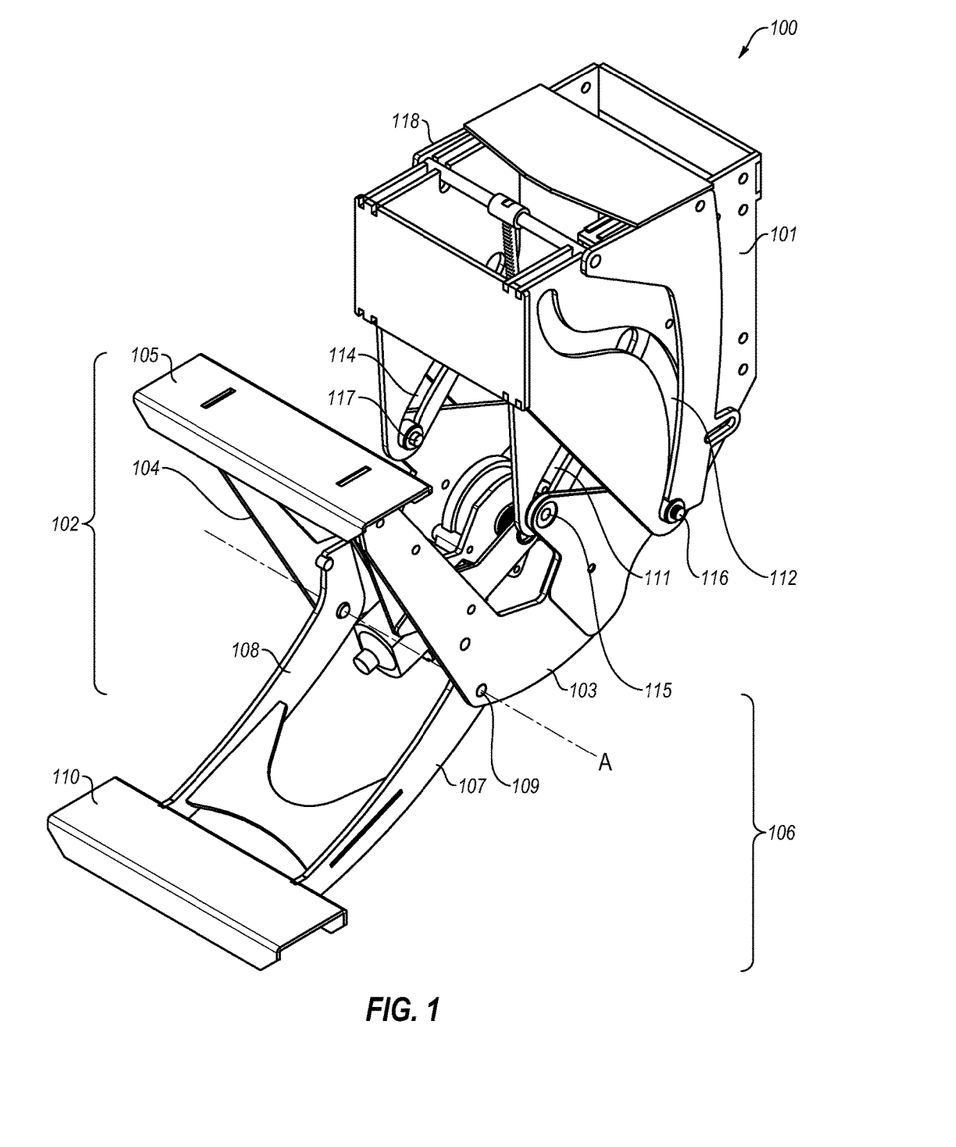
FIG. 1 is a perspective view of one embodiment of an actuatable compact vehicle step in deployed or extended position.

The present invention in its various embodiments, some of which are depicted in the figures herein, is an actuatable compact vehicle step. Referring now to FIG. 1, one embodiment of the actuatable compact vehicle step 100 is shown. The actuatable compact vehicle step 100 includes a housing portion 101. The housing portion 101 may be generally rectangular and have one or more open sides, including an open bottom and/or front. A first step portion 102 is attached to, and pivotable with respect to the housing portion 101. In certain embodiments, housing portion 101 is configured to substantially enclose or encase the actuatable compact vehicle step 100. However, in other embodiments, the housing portion 101 may be a minimal or otherwise configured mounting bracket, leaving the first step portion 102 generally exposed when in operation. Housing portion 101 may be configured in numerous ways without departing from the purpose and scope of the invention.

In the illustrated embodiment, first step portion 102 has one or more V-shaped, U-shaped, or acutely-angled support members 103, 104, with a first end 105 of the first step portion 102 forming a first step, and a second end of the first step portion 102 configured to attach the first step portion 102 to the housing portion 101. In certain embodiments, the actuatable compact vehicle step 100 also has a second step portion 106 with support members 107, 108. The second step portion 106 is configured to pivotally attach to the first step portion 102 adjacent to a first step portion vertex or trough of one or more first step portion's support members 103, 104 at one or more pivot points 109 and/or within or along a single axis A. At one end, second step portion 106 has a second step 110.

First 102 and/or second 106 step portions are configured for travel between an outward deployed position and an inward nested position with respect to the housing portion 101, described in more detail below. Step movement is accomplished through an actuator 201 coupled to first 102 and/or second 106 step portions, the actuator 201 configured to lower the actuatable compact vehicle step 100 out of the housing portion 101 to an extended or deployed position and retract the actuatable compact vehicle step 100 to the retracted or nested position. Actuator 201 may be either automatically or manually initiated by a user in any number of ways suitable to the application, including, for example, by wireless means such as a key fob, voice activation, or the like.

One exemplary path of travel of first 102 and second 106 step portions between nested and deployed positions is determined by tracks 111-114 adjacent to the housing portion 101. Specifically, adjacent to second end of the first step portion 102 are first 115, second 116, third 117, and fourth 118 followers (rollers in the illustrated embodiment) correspond to and travel within first 111, second 112, third 113, and fourth 114 tracks, respectively. In certain embodiments, these tracks 111-114 are cam-profiled, curved, and/or S-shaped and comprise one or more opposing pairs. Two or more pairs may be located on opposing sides of the housing portion 101.

Referring now to FIGS. 3-6, deployed B, interim C and D, and nested E step positions are shown, as well as an exemplary path of travel between those positions according to the structure of the illustrated embodiment of the invention. Although discrete movements are described herein, these or other movements may combine to form a single fluid and/or continuous curved motion.

Figure 2:
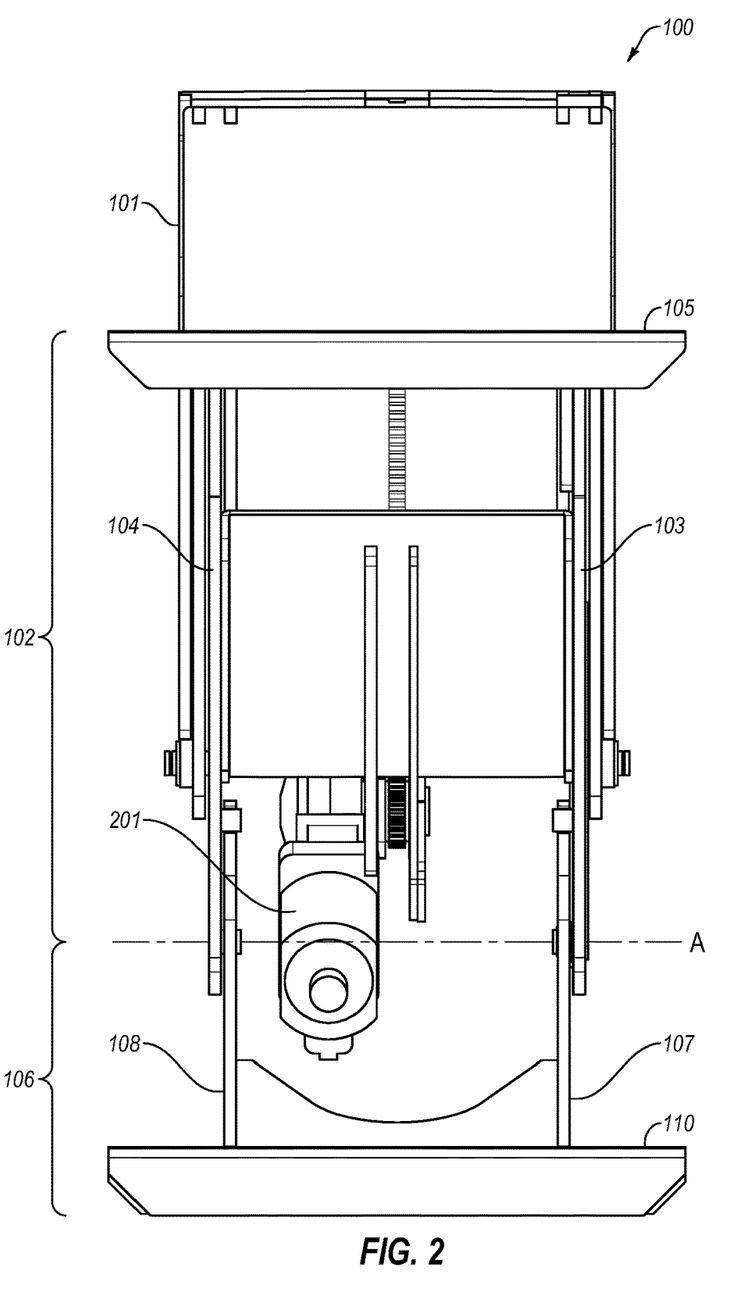
FIG. 2 is a front view of one embodiment of an actuatable compact vehicle step in deployed or extended position.
Figure 3:
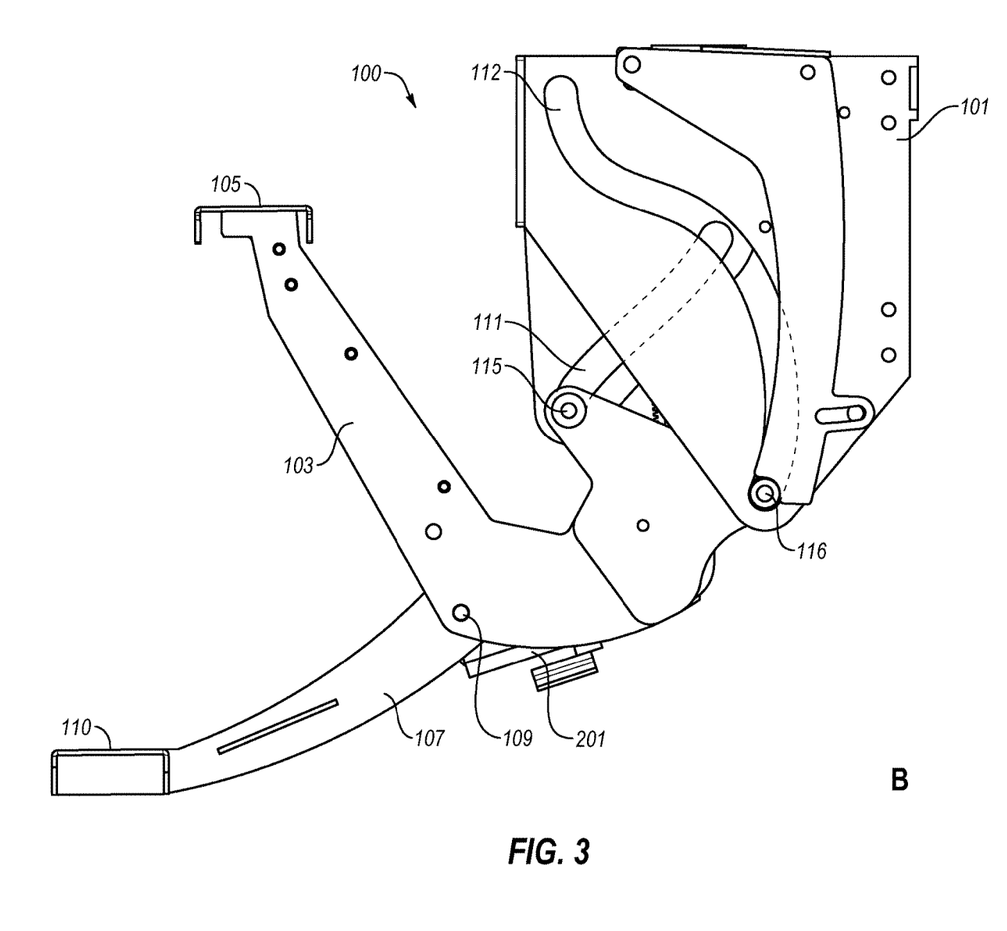
FIG. 3 is a side view of one embodiment of an actuatable compact vehicle step in fully deployed or extended position.

In FIG. 3, the actuatable compact vehicle step 100 is shown in fully deployed position B. Ends 105, 110 of first 102 and second 106 step portions are bifurcated from a common pivot point 109 or axis A (see FIGS. 1 & 2). When deployed or extended, the second step 110 is in a position substantially below the first step 105 and/or housing portion 101. Specifically, and referring briefly to FIG. 2, when the actuatable compact vehicle step 100 is deployed, first 105 and second 110 steps are located at different elevations or points on a Y-axis, the second step 110 configured to extend to a position substantially below the first step 105 and/or housing portion 101.

Figure 4:
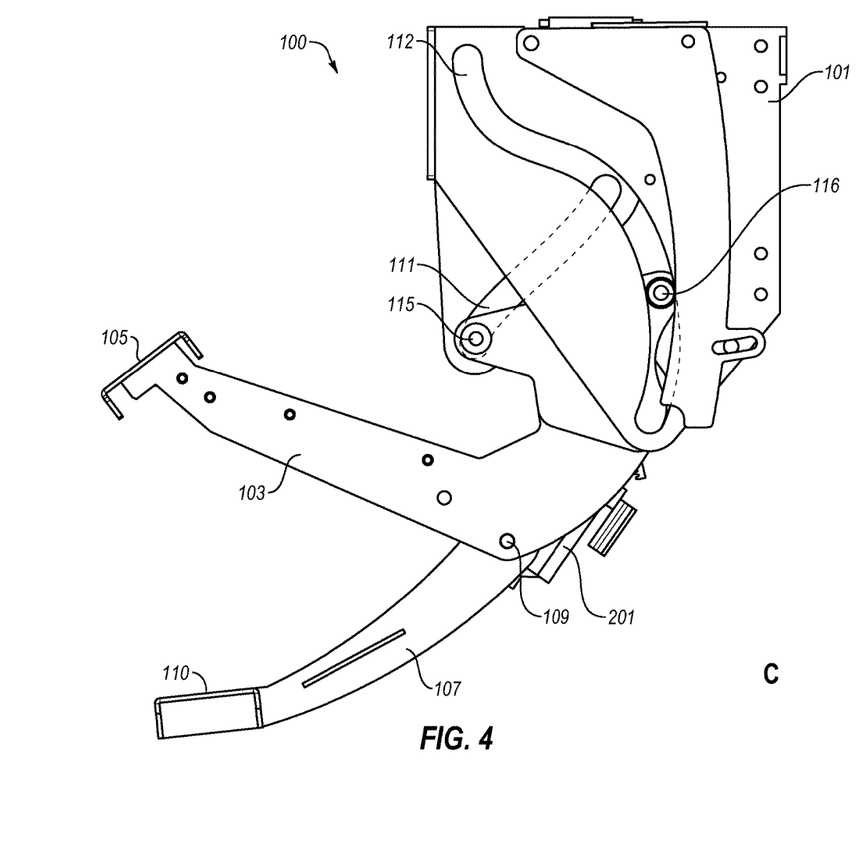
FIG. 4 is a side view of one embodiment of an actuatable compact vehicle step in a first intermediate position.

FIG. 4 shows the actuatable compact vehicle step 100 in a first intermediate position C. First 115 and second 116 followers pivot within and/or travel along first 111 and second 112 tracks, respectively. Third 117 and fourth 118 followers pivot within and/or travel along third 113 and fourth 114 tracks, respectively. Second 116 and fourth 118 followers travel at a relatively greater distance than first 115 and third 117 rollers between positions B and C. Bifurcation of first 102 and second 106 step portions from a common pivot point 109 or axis A is reduced from where it began in position B, as first 102 and second 106 step portions begin to fold together at first intermediate position C.

Figure 5:
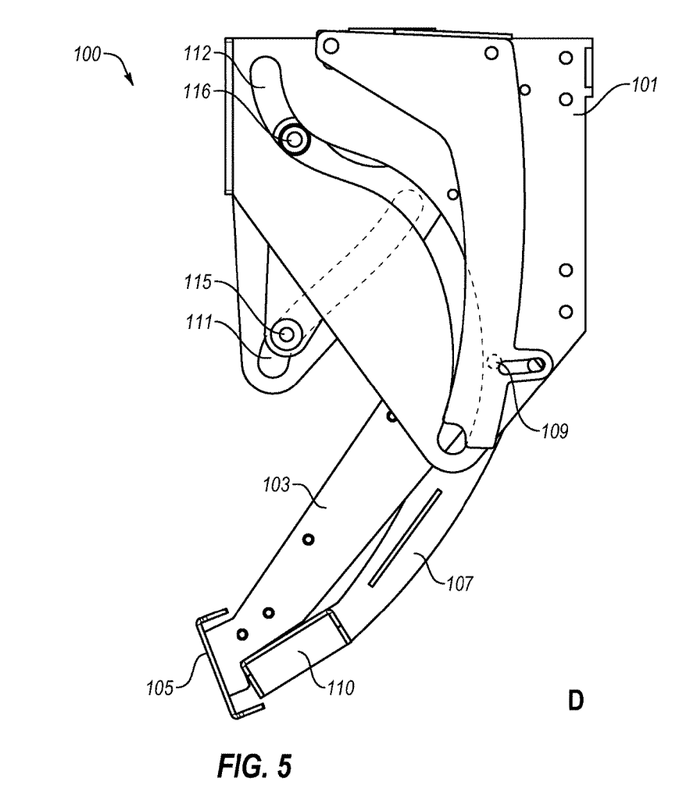
FIG. 5 is a side view of one embodiment of an actuatable compact vehicle step in a second intermediate position.

FIG. 5 shows the actuatable compact vehicle step 100 in a second intermediate position D. First 115 and second 116 followers pivot within and/or travel along first 111 and second 112 tracks, respectively. Third 117 and fourth 118 followers pivot within and/or travel along second 113 and fourth 114 cam profile cutouts, respectively, again at a relatively greater distance than first 115 and second 116 followers, to continue retracting the step 100 up into the housing portion 101. First 102 and second 106 step portions are folded together at second intermediate position D.

Figure 6:
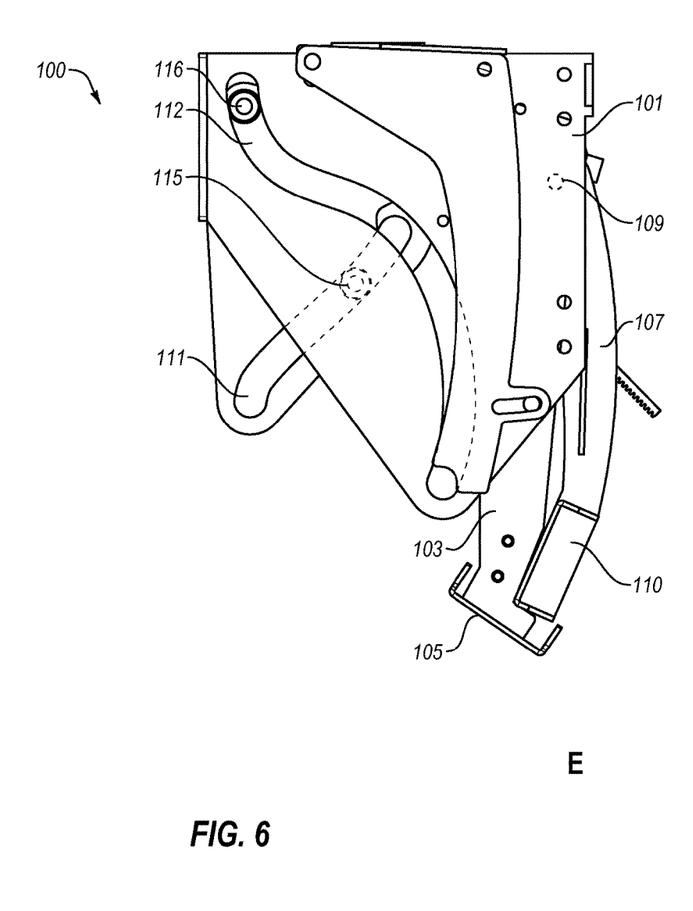
FIG. 6 is a side view of one embodiment of an actuatable compact vehicle step in fully nested or retracted position.

FIG. 6 shows the actuatable compact vehicle step 100 in a fully retracted position E. Third 117 and fourth 118 followers pivot within and/or travel along third 113 and fourth 114 tracks, respectively. First 115 and third 117 followers travel at a relatively greater distance than second 116 and fourth 118 followers between positions D and E. First 102 and second 106 step portions are nested within the housing portion 101 at fully retracted position E.

In certain embodiments, the actuatable compact vehicle step 100 is configured for attachment to and/or mount within an open space of a vehicle between a body panel and frame. When nested, such embodiments are preferably concealable from a typical user's view outside of the vehicle. These types of embodiments may serve, for example, as a vehicle bed step for accessing various elevations or points of a vehicle. In other embodiments, the actuatable compact vehicle step 100 is configured as a bifurcating rocker-panel-type step for placement outside of a vehicle, and specifically on the side thereof.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An actuatable step for a vehicle comprising:
   a first step portion,
   a second step portion pivotally attached to the first step portion along a single axis, and
   an actuator for moving first and second step portions between nested and deployed positions,
   wherein the first and second step portions are configured to bifurcate from the single axis when the actuatable step is deployed,
   the second step portion located substantially below the first step portion when the actuatable step is in a deployed position.

2. The actuatable step for a vehicle of claim 1, further comprising a housing portion wherein the first and second step portions are configured to nest.

3. The actuatable step for a vehicle of claim 2, wherein the first and second step portions are generally perpendicular to a horizontal plane of the ground when the actuatable step is in a nested position.

4. The actuatable step for a vehicle of claim 2, further having:
   a first step portion first end forming a first step,
   a first step portion second end for attaching the first step portion to the housing, and two or more followers adjacent to the first step portion second end.

5. The actuatable step for a vehicle of claim 4, further having two or more curved tracks upon which the two or more followers travel as the actuatable step moves between nested and deployed positions.

6. The actuatable step for a vehicle of claim 5 wherein the two or more curved tracks are substantially S-shaped.

7. The actuatable step for a vehicle of claim 6, the actuatable step further concealable from the ordinary view of a user from outside of the vehicle when the actuatable step is in a nested position.

8. An actuatable compact vehicle step comprising:
   a housing portion,
   a first step portion connected to the housing portion,
   a second step portion connected to the housing portion and pivotally attached to the first step portion only along a single axis,
   an actuator for moving first and second step portions between nested and deployed positions,
   the first and second step portions configured to bifurcate from the single axis to a deployed position,
   the second step portion located substantially below the first step portion when the actuatable compact vehicle step is in a deployed position.

9. The actuatable compact vehicle step of claim 8, further having a first step portion first end forming a first step, a first step portion second end for attaching the first step portion to the housing, and two or more followers adjacent to the first step portion second end.

10. The actuatable compact vehicle step of claim 9, further having two or more curved tracks upon which the two or more followers travel as the actuatable compact vehicle step moves between nested and deployed positions.

11. The actuatable compact vehicle step of claim 10 wherein the two or more generally curved tracks are substantially S-shaped.

12. The actuatable compact vehicle step of claim 8, wherein the first step portion has one or more acutely angled support members.

13. The actuatable compact vehicle step of claim 12, wherein the single axis is located adjacent to a vertex of the one or more acutely angled support members.

14. The actuatable compact vehicle step of claim 8, further configured to be concealable from the ordinary view of a user from outside of the vehicle when the actuatable compact vehicle step is in a nested position.

15. An actuatable step for a vehicle with:
   two or more step portions;
   an actuator for moving two or more step portions between nested and deployed positions, one or more support members connected to each of the two or more step portions and actuator, the one or more support members each having two or more followers adjacent to an end; and two or more S-shaped tracks upon which the two or more followers travel as the step moves between nested and deployed positions.

16. The actuatable step for a vehicle of claim 15, wherein the one or more step portions are pivotally attached along and bifurcate from a single axis.

17. The actuatable step for a vehicle of claim 15, the actuatable step further concealable from the ordinary view of a user from outside of the vehicle when the actuatable step is in a nested position.

18. An actuatable step for a vehicle comprising:
a first step portion,
a second step portion pivotally attached to the first step portion along a single axis, and
an actuator for moving first and second step portions between nested and deployed positions,
wherein the first and second step portions are configured to bifurcate from the single axis when the actuatable step is deployed, and
a housing portion wherein the first and second step portions are configured to nest.

19. An actuatable step for a vehicle comprising:
a first step portion,
a second step portion pivotally attached to the first step portion along a single axis, and
an actuator for moving first and second step portions between nested and deployed positions,
wherein the first and second step portions are configured to bifurcate from the single axis when the actuatable step is deployed, and
the actuatable step further concealable from the ordinary view of a user from outside of the vehicle when the actuatable step is in a nested position.

* * * * *